United States Patent [19]

Kuwahara et al.

[11] Patent Number: 4,737,408
[45] Date of Patent: Apr. 12, 1988

[54] MAGNETO-OPTICAL RECORDING MEDIUM HAVING PLASMA-POLYMERIZED PROTECTIVE LAYERS

[75] Inventors: Tsuneo Kuwahara; Masatoshi Nakayama; Hideki Hirata, all of Nagano, Japan

[73] Assignee: TDK Corporation, Tokyo, Japan

[21] Appl. No.: 897,087

[22] Filed: Aug. 18, 1986

[30] Foreign Application Priority Data

Aug. 21, 1985 [JP] Japan .................. 60-183285
Aug. 22, 1985 [JP] Japan .................. 60-184799
Aug. 23, 1985 [JP] Japan .................. 60-185090

[51] Int. Cl.$^4$ ............................................... G11B 7/24
[52] U.S. Cl. .................. 428/335; 428/336; 428/461; 428/500; 428/694; 428/900
[58] Field of Search ............... 428/694, 900, 335, 336, 428/457, 461, 500; 365/122; 369/13, 288; 350/325, 326; 360/131, 134

[56] References Cited

U.S. PATENT DOCUMENTS 4,546,464 10/1985 Inoue et al. .................. 427/240

FOREIGN PATENT DOCUMENTS 109784 8/1981 Japan .
90246 5/1984 Japan .
60-181327 8/1985 Japan .
60-180729 8/1985 Japan .
60-182767 8/1985 Japan .
2164269 3/1986 United Kingdom .

Primary Examiner—George F. Lesmes
Assistant Examiner—William M. Atkinson
Attorney, Agent, or Firm—Oblon, Fisher, Spivak, McClelland & Maier

[57] ABSTRACT

In a magneto-optical recording medium comprising a perpendicular magnetizable thin film layer formed from an amorphous rare earth metal-transition metal alloy on a substrate with or without an intermediate layer, and a first protective layer formed from a plasma-polymerized film on the magnetizable layer; a second protective layer is formed on the first protective layer by curing a radiation-curable compound coating and/or an undercoat layer of a plasma-polymerized film is formed on the substrate in order to improve the moisture proofness of the magnetic layer. The substrate may be plasma treated to improve adherence. Covering the overall outside surface of the medium with a cured film of a radiation-curable compound ensures best shelf stability.

32 Claims, 3 Drawing Sheets

MAGNETO-OPTICAL RECORDING MEDIUM HAVING PLASMA-POLYMERIZED PROTECTIVE LAYERS

BACKGROUND OF THE INVENTION

This invention relates to magneto-optical recording media of the type wherein information is recorded and reproduced with the use of heat and light of a laser beam.

For optical recording media of magneto-optical memory type, there are well known a number of materials for a recording layer thereof, for example, MnBi, MnAlGe, MnSb, MnCuBi, GdFe, TbFe, GdCo, PtCo, TbCo, TbFeCo, GdFeCo, TbFeO$_3$, GdIG (gadolinium iron garnet), GdTbFe, GdTbFeCoBi, CoFe$_2$O$_4$, etc. These materials are deposited on transparent substrates of plastic material or glass as a thin film by any suitable thin-film forming techniques such as vacuum deposition or sputtering. The features common to these magneto-optical recording thin film layers are that the axis of easy magnetization is perpendicular to the film surface and that Kerr and Farady effects are great.

By taking advantage of these features, the following optical magnetic recording process is contemplated for such optical magnetic recording thin films. At the outset, the entire film is rendered "0", that is, uniformly magnetized or erased. A laser beam is applied to the film at the site where it is desired to record "1". The temperature of that region of the film exposed to the beam is increased, and coercive force Hc approaches 0 when the temperature approaches and then exceeds the Curie point. When the temperature is allowed to return to room temperature after extinction of the laser beam, the magnetization is reversed by the energy of demagnetizing field. Alternatively, the temperature is allowed to return to room temperature with an external magnetic field being applied in an opposite direction to that at the initial during exposure to the laser beam, and then magnetization is reversed. There is recorded a signal "1". The remaining portion of the film where no laser beam is incident remains "0" because the initial state is "0".

The recorded data in the optical magnetic memory is read out by similarly using a laser beam to detect the magneto-optical effect, that is, the rotation of the plane of polarization of reflected light with respect to the incident laser beam due to the reversal of magnetization.

Requirements imposed on such optical magnetic recording media are:
(1) that the Curie point is of the order of 100° to 200° C. and the compensation point is close to room temperature,
(2) that noise-inducing defects such as grain boundary is relatively small, and
(3) that a magnetically and mechanically uniform film is attained over a relatively large area without resorting to a high temperature or long term film formation process.

In the light of these requirements, a great attention is recently drawn to amorphous perpendicular magnetizable thin films of rare earth element-transition metal among the above-mentioned materials. Optical magnetic recording media having such amorphous perpendicular magnetizable thin films of rare earth element-transition metal, however, have a storage problem. If the magnetic thin film layers are stored in contact with the ambient atmosphere, rare earth elements therein are preferentially eroded or oxidized by oxygen and moisture in the atmosphere, losing the necessary information recording and reproducing ability.

For this reason, most efforts are generally directed to those recording media of the construction having a protective layer interposed between the substrate and the magnetic thin film layer. Known protective layers are vacuum deposited films of inorganic materials such as SiO and SiO$_2$ as well as coatings of room temperature curable resins. However, these protective layers provide insufficient moisture protection, leaving a problem of shelf deterioration.

One approach to this problem is our proposal to form a plasma-polymerized film on the substrate (see Japanese Patent Application No. 60-180729 filed Aug. 17, 1985).

We have also proposed to form a plasma-polymerized film on a plasma-treated substrate and to form a magnetic thin film layer thereon in order to achieve an improvement in the adherence between the substrate and the magnetic thin film as well as improvements in the performance and durability of the medium (see Japanese Patent Application No. 60-181327 filed Aug. 19, 1985).

A still further proposal is to form a plasma-polymerized film on the substrate of a magnetic thin film layer in order to prevent deterioration of the magnetic layer by moisture or other undesirable substances from its surface (see Japanese Patent Application No. 60-182767 filed Aug. 20, 1985).

These proposals, however, do not fully meet the required properties of magneto-optical recording media. There is a need for magneto-optical recording media having more improved properties.

SUMMARY OF THE INVENTION

An object of the present invention is to provide a novel and improved magneto-optical recording medium which has improved properties, high durability, and good shelf stability even in a highly humid atmosphere.

The present invention is directed to a magneto-optical recording medium comprising a perpendicular magnetizable thin film layer formed from an amorphous rare earth metal-transition metal alloy on a substrate with or without an intermediate layer.

According to a first aspect of the present invention, the medium further comprises
a first protective layer formed from a plasma-polymerized film on the magnetizable layer, and
a second protective layer formed on the first protective layer by curing a radiation-curable compound coating wih radiation.

According to a second aspect of the present invention, the magneto-optical recording medium further comprises
an undercoat layer formed from a plasma-polymerized film on the substrate,
the magnetizable layer being formed on the undercoat layer with or without an intermediate layer, and
a protective layer formed from a plasma-polymerized film on the magnetizable layer.

In a magneto-optical recording medium as defined in the second aspect, the substrate may be plasma treated on the surface thereof.

According to a still further aspect of the present invention, there is provided a magneto-optical recording medium comprising a substrate, a perpendicular magnetizable thin film layer formed from an amorphous rare earth metal-transition metal alloy on the substrate, an undercoat layer formed from a plasma-polymerized film on the surface of the magnetizable layer adjacent to the substrate, and/or a protective layer formed from a plasma-polymerized film on the other surface of the magnetizable layer remote from the substrate, and a coating formed from a cured film of a radiation-curable compound to cover the overall outer surface of the medium.

BRIEF DESCRIPTION OF THE DRAWINGS

The above and other objects, features, and advantages of the present invention will be more readily understood from the following description when taken in conjunction with the accompanying drawings, in which.

DETAILED DESCRIPTION OF THE INVENTION

Figure 1:
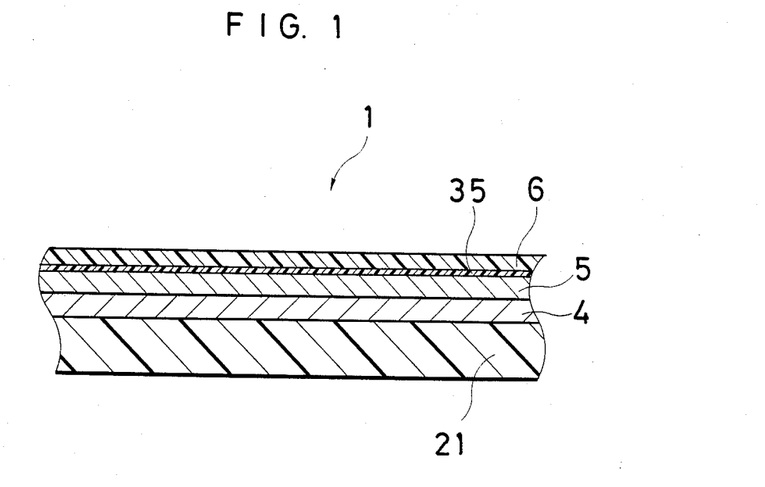
FIGS. 1, 2, and 3 are cross-sectional views of different embodiments of the present invention.
Figure 2:
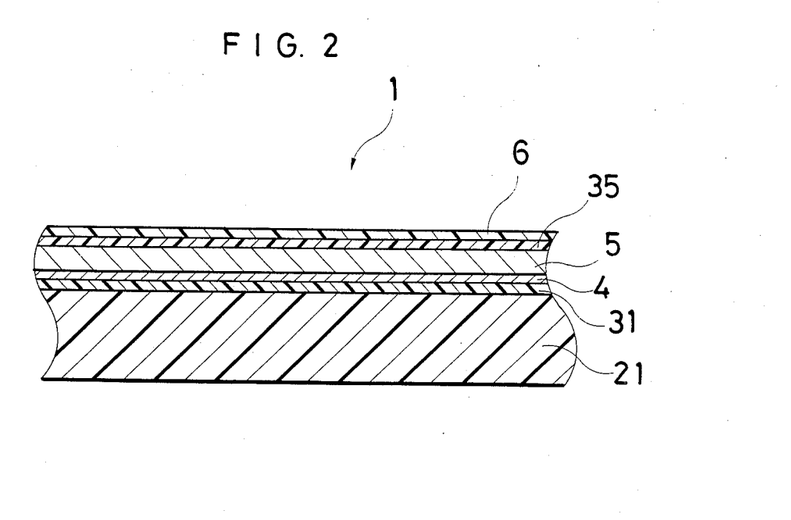
Figure 3:
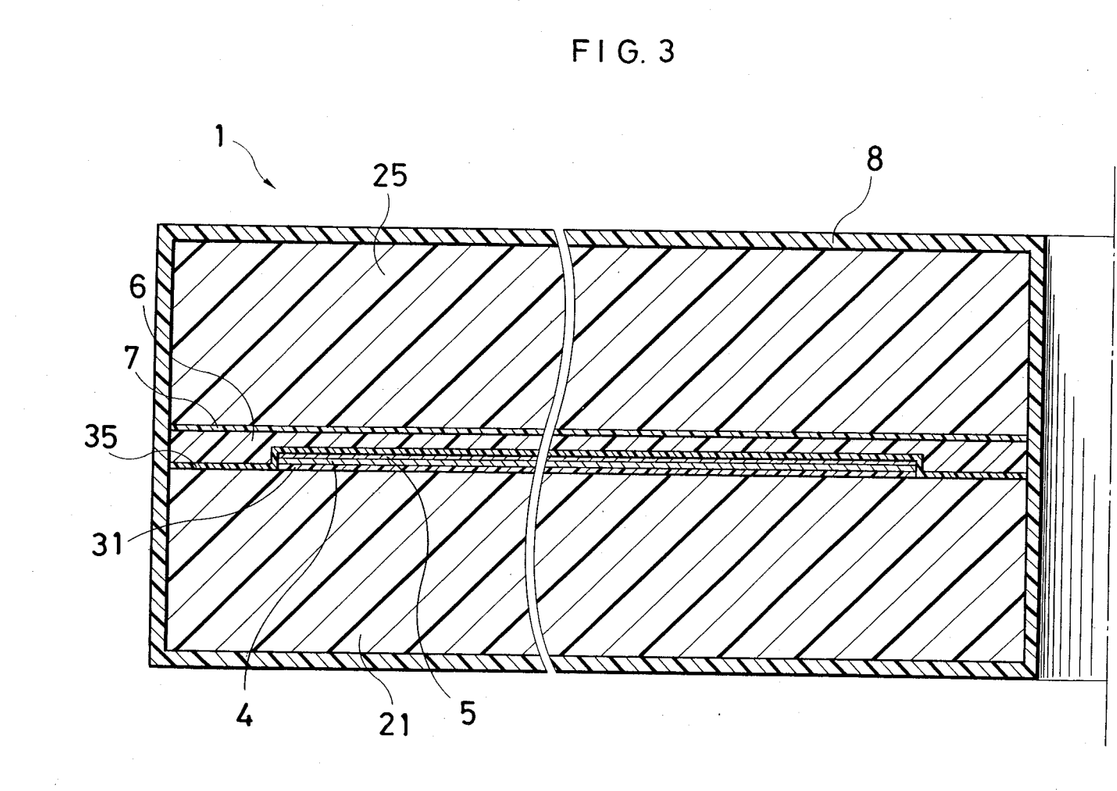

Three different, preferred embodiments of the opto-magnetic recording medium of the present invention are illustrated in FIGS. 1, 2, and 3.

The magneto-optical recording medium according to the present invention is generally designated at 1 as comprising a substrate 21 having a pair of opposed major surfaces and a magnetizable thin-film layer 5 on one substrate major surface. The medium further includes an undercoat layer 31 of plasma-polymerized film formed on the surface of the magnetizable layer 5 adjacent to the substrate, and/or a protective layer 35 of plasma-polymerized film formed on the surface of the magnetizable layer 5 remote from the substrate.

The substrates 21 for use in the magneto-optical recording medium according to the present invention are generally formed of resinous materials, typically acrylic resins, polycarbonate resins, epoxy resin, and olefinic resins such as polymethylpentene, but they may also be formed of glass, ceramic or similar materials.

Since it is preferred to carry out recording through the substrates, their transmittance of recording or reading-out light is preferably 86% or higher. In general, the substrates are of disk shape having a thickness of about 1.2 to 1.5 mm, but they may be formed in another shape, for example, tape and drum.

The surface of such a disk-shaped substrate on which the magnetic thin-film layer is formed may be provided with a tracking groove. The groove has a depth of about $\lambda/8n$, especially from $\lambda/7n$ to $\lambda/12n$ wherein $\lambda$ is the wave length of a laser beam used and n is the refractive index of the substrate.

Those portions of the magnetic thin-film layer which are located on the bottom of the channels constitute recording tracks where writing and reading light beams are preferably directed from the rear surface of the substrate. With this construction, the reading S/N ratio is improved and a control signal of a greater magnitude is available for tracking.

The undercoat layer 31 is preferably a plasma-polymerized thin film comprising carbon. It may consist essentially of carbon alone or carbon and at least one other element. When it is desired to form a plasma-polymerized film undercoat layer 31 containing carbon and another element, the other element may be selected from hydrogen (H), nitrogen (N), and oxygen (O), and mixtures thereof.

Exemplary of the source gas from which the film is plasma polymerized are saturated and unsaturated hydrocarbons, for example, methane, ethane, propane, butane, pentane, ethylene, propylene, butene, butadiene, acetylene, methylacetylene, and the like, and mixtures thereof. Preferably, they are gaseous at room temperature because of ease of operation. If desired, a hydrocarbon which is liquid at room temperature may be used as the source material for plasma polymerization. Another class of preferred source material include mixtures of at least one such hydrocarbon and at least one member selected from $H_2$, $O_2$, $O_3$, $H_2O$, $N_2$, $NO_x$ (such as NO and $N_2O$, and $NO_2$), $NH_3$, CO, $CO_2$, etc. The source material may optionally contain a minor proportion of silicon (Si), boron (B), phosphorus (P), sulfur (S), etc.

The plasma-polymerized film undercoat layer 31 may be formed solely from carbon by adding a large volume of hydrogen to a hydrocarbon gas, and subjecting the gas mixture to plasma polymerization to produce a carbon film. The resulting carbon film varies its carbon structure depending on mixed gas ratio, plasma exciting power, substrate temperature, and other parameters.

Using such source materials, the plasma-polymerized film undercoat layer 31 is generally formed to a thickness of about 10 to about 1,000 Å. No additional advantage is obtained with undercoat layers in excess of 1,000 Å and it is thus unnecessary to increase the thickness beyond this upper limit. Undercoat layers thinner than 10 Å are ineffective. It is to be noted that the film thickness may be measured by means of an ellipsometer, for example.

Control of film thickness in forming the plasma-polymerized film undercoat layer 31 may be done by controlling reaction time, source gas flow rate, and the like.

The plasma-polymerized film is prepared by using the above-mentioned source gas, for example, hydrocarbon, creating an electrical discharge plasma of the gas, and contacting the plasma with the substrate.

The principle of plasma treatment will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma. Since gaseous molecules have a less chance of collision with electrons and absorb little energy, they are kept at a tempeature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. Substrates are plasma treated under these conditions according to the present invention. The use of a low temperature plasma avoids any thermal influence on substrate.

Figure 4:
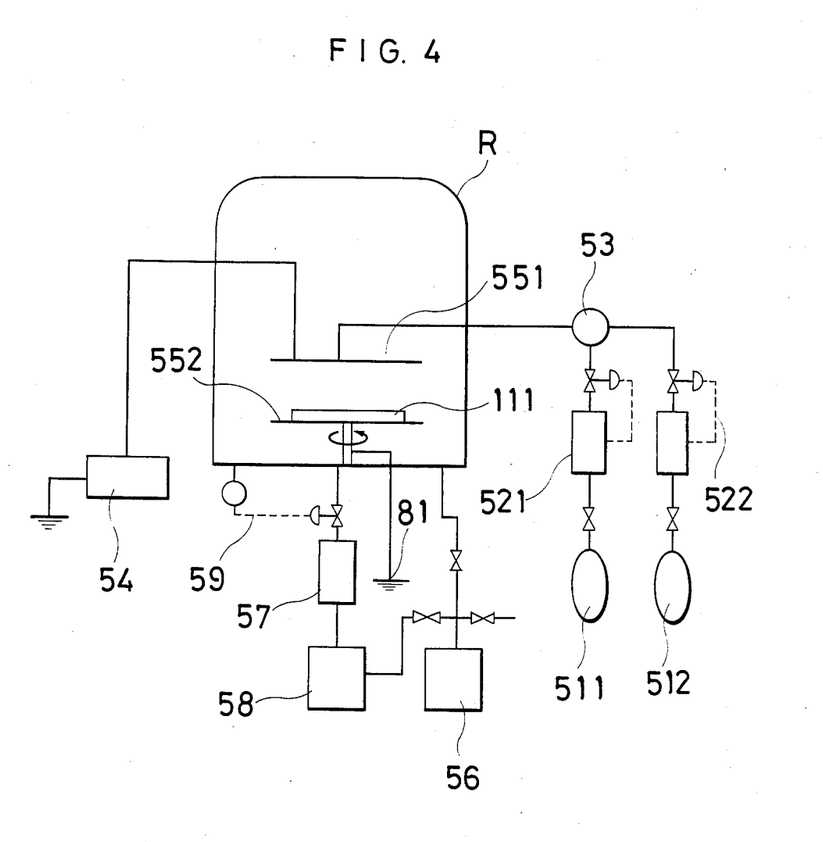
FIG. 4 is a diagrammatic view of a plasma polymerization apparatus.

FIG. 4 illustrates a typical apparatus in which a substrate on its surface is treated with a plasma. This plasma apparatus uses a variable frequency power source. The apparatus comprises a reactor vessel R into which a source gas or gases are introduced from a source 511 and/or 512 through a mass flow controller 521 and/or 522. When desired, different gases from the sources 511 and 512 may be mixed in a mixer 53 to introduce a gas mixture into the reactor vessel. The source gases each may be fed at a flow rate of 1 to 250 ml per minute.

Disposed in the reactor vessel R is means for supporting a substrate to be treated. In this embodiment, a substrate to be treated 111 rests on a rotary electrode 552. Another electrode 551 is opposed to the rotary electrode 552 so as to sandwich the substrate 111 therebetween. One electrode 551 is connected to a variable frequency power source 54 and the other rotary electrode 552 grounded at 81.

The reactor vessel R is further connected to a vacuum system for evacuating the vessel, including a vacuum pump in the form of an oil rotary pump 56, a liquefied nitrogen trap 57, an oil diffusion pump 58, and a vacuum controller 59. The vacuum system has the capacity of evacuating and keeping the reactor vessel R at a vacuum of 0.01 to 10 Torr.

In operation, the reactor vessel R is first evacuated by means of the vacuum pump to a vacuum of $10^{-5}$ Torr or lower before a source gas or gases are fed into the vessel at a given flow rate. Then the interior of the reactor vessel is maintained at a vacuum of 0.01 to 10 Torr. When the flow rate of the source gas mixture becomes constant, the variable frequency power 54 is turned on to generate a plasma with which a plasma-polymerized film is formed on the substrate.

A carrier gas may be used, for example, Ar, $N_2$, He, and $H_2$. Operating parameters such as applied current and treating time may be as usual and properly chosen without undue experimentation. Plasma generation may be conducted by microwave discharge, DC discharge, and AC discharge as well as commmonly used high frequency discharge.

The thus produced plasma-polymerized film undercoat layer 31 contains C and at least one optional element of H, N, and O as previously mentioned. The carbon content ranges from 30 to 100 atom% of the plasma-polymerized film undercoat layer, preferably from 30 to 90 atom%. Carbon contents of less than 30 atom% results in weak plasma-polymerized films which are impractical.

It is preferred with respect to the optional elements, H, N, and O contained along with C that the atomic ratio of hydrogen to carbon (H/C) is up to 1, especially from 1/6 to 1, the atomic ratio of nitrogen to carbon (N/C) is up to 3/10, especially from 1/20 to 3/10, and the atomic ratio of oxygen to carbon (O/C) is up to 3/10, especially from 1/20 to 3/10. By introducing at least one of H, N, and O in addition to C, the resulting film is improved in scratch resistance.

It should be noted that the contents of C, H, N, O and other elements in the plasma-polymerized film undercoat layer 31 may be determined by SIMS (secondary ion mass spectroscopy), for example. When SIMS is used, the contents of C, H, N, O and other elements may be calculated by determining the count of the respective elements. The measurement of SIMS may be in accord with the article "SIMS and LAMMA" in the Surface Science Basic Lectures, Vol. 3, 1984 (Tokyo), Elementary and Application of Surface Analysis, page 70. Alternatively, the contents of C, H, N, O and other elements may be calculated by determining the profile of the respective elements while effecting ion etching with Ar or the like.

The plasma-polymerized film undercoat layer 31 is preferably formed on the substrate 21 which has been plasma treated. The surface of the substrate become more adherent by treating with a plasma, and the adherence between the substrate and the undercoat layer is improved.

The plasma treatment of the substrate surface may be effected by substantially the same process as previously described for the plasma polymerization with respect to its principle, operation, and conditions. The difference is that an inorganic gas is used as the treating gas in the plasma treatment of the substrate whereas the formation of plasma-polymerized film undercoat layer 31 by plasma polymerization uses an organic gas optionally containing an inorganic gas as the souce gas.

The treating gas employed in the plasma treatment of the substrate is not particularly limited. Any inorganic gas may be used for the purpose, for example, $H_2$, Ar, He, $O_2$, $N_2$, air, $NH_3$, $O_3$, $H_2O$, $NO_x$ (such as NO, $N_2O$, and $NO_2$), and mixtures thereof. The type of the electric source used for the plasma treatment is not particularly limited, and DC, AC, and microwave sources may be used.

The plasma-polymerized film undercoat layer 31 is formed on the thus plasma-treated substrate 21. According to the present invention, the magnetic thin-film layer 5 is formed on the plasma-polymerized film undercoat layer 31 with or without interposing an intermediate layer 4 therebetween.

The magnetic thin-film layer 5 is a layer in which signals indicative of information are magnetically recorded using a modulated thermal beam or modulated magnetic field and the recorded signals are reproduced through magnetic-to-optical signal conversion. Most preferred for this purpose are so-called perpendicular magnetizable films.

The magnetic thin-film layers are generally formed from alloys containing rare earth elements and transition metals by conventional techniques such as sputtering and vacuum deposition to produce an amorphous film on an ordinary thickness. The rare earth elements and transition metals used include all the members of their chemically defined classes. The preferred rare earth elements are gadolinium (Gd) and terbium (Tb), and the preferred transition metals are iron (Fe) and cobalt (Co). Their preferred combinations are GdFe, TbFe, TbFeCo, GdFeCo, GdTbFe, GdTbFeCo, etc. The rare earth metals and transition metals comprise 15 to 35 atom% and 65 to 85 atom% of the layer, respectively. The magnetic thin-film layers are preferably 0.05 to 0.1 μm thick.

The magnetic thin-film layer 5 may be formed on the substrate through the intermediate layer 4 as previously mentioned. The intermediate layer 4 may be formed from such materials as $SiO_2$, SiO, AlN, $Si_3N_4$, and ZnS by vacuum deposition or sputtering. The intermediate layer has a thickness of 0.05 to 0.2 μm.

To provide the moisture proofness of the magnetic thin-film layer on its surface remote from the substrate, the protective layer 35 is formed from a plasma-polymerized film as previously mentioned.

The protective layer 35 of plasma-polymerized film may be formed by substantially the same process as previously described for the plasma-polymerized film undercoat layer 31 with respect to its principle, operation, and conditions. This is also true for the composition and thickness of plasma-polymerized film.

The plasma-polymerized film protective layer 35 is preferably formed so as to completely cover the magnetic thin-film layer 5 as shown in FIG. 3.

It is desirable to further form on the plasma-polymerized film protective layer 35 a second protective layer 6 of a different material. The provision of such double protective layers, of course, further improve the moisture proofness of the magnetic layer on its surface remote from the substrate.

The material of which the second protective layer 6 is made is not particularly limited. The second protective layers may be formed from either organic materials such as radiation-curable compounds, thermosetting resins, two-part reactive curing compositions, and thermoplastic resins or inorganic materials such as silicon oxide and silicon nitride. Most preferred among them are those obtained by curing radiation-curable compounds with radiation.

Illustrative radiation-curable compounds include monomers, oligomers and polymers having contained or incorporated in their molecule groups capable of crosslinking or polymerizing upon exposure to radiation, for example, acrylic double bonds as given by acrylic and methacrylic acids having an unsaturated double bond capable of radical polymerization in response to an ionization energy and esters thereof, allyl double bonds as given by diallyl phthalate, and unsaturated double bonds as given by maleic acid and maleic derivatives. The radiation-curable monomers used herein are those compounds having a molecular weight of less than 2,000 and the oligomers are those compounds having a molecular weight of 2,000 to 10,000.

The radiation-curable compounds having unsaturated double bonds which may be used as oligomers and monomers in the present invention include styrene, ethylacrylate, ethylene glycol diacrylate, ethylene glycol dimethacrylate, diethylene glycol acrylate, diethylene glycol dimethacrylate, 1,6-hexaneglycol diacrylate, and 1,6-hexaneglycol dimethacrylate. More preferred are pentaerythritol tetraacrylate (and methacrylate), pentaerythritol triacrylate (and methacrylate), trimethylolpropane triacrylate (and methacrylate), trimethylolpropane diacylate (and methacrylate), polyfunctional oligoester acrylates (e.g., Aronix M-7100, M-5400, 5500, 5700, M-6250, M-6500, M-8030, M-8060, M-8100, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of trimethylolpropane diacrylate (methacrylate) phenol ethylene oxide adducts, compounds having a pentaerythritol fused ring represented by the following general formula and having an acryl or methacryl group or epsilon-caprolactone-acryl group attached thereto:

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

$$(CH_2=CHCOOCH_2)_3-CCH_2OH \quad (1)$$
(Special acrylate A)

$$(CH_2=CHCOOCH_2)_3-CCH_2CH_3 \quad (2)$$
(Special acrylate B)

$$(CH_2=CHCO(OC_3H_6)_n-OCH_2)_3-CCH_2CH_3 \quad (3)$$
(Special acrylate C)

(Special acrylate D)

(Special acrylate E)

(Special acrylate F)   (6)

(n ≈ 16)   (Special acrylate G)   (7)

$CH_2=CHCOO—(CH_2CH_2O)_4—COCH=CH_2$   (8)
(Special acrylate H)

(Special acrylate I)   (9)

(Special acrylate J)   (10)

A: acrylate acid   X: polyhydric alcohol
Y: polybasic acid   (Special acrylate K)   (11)

$A(M—N)_n—M—A$   (12)
A: acrylic acid   M: dihydric alcohol   N: dibasic acid
(Special acrylate L)

The radiation-curable oligomers include polyfunctional oligo-ester acrylates as represented by the following general formula:

wherein $R_1$ and $R_2$ are alkyl and n is an integer, and acryl-modified urethane elastomers, and derivatives thereof having such a functional group as COOH incorporated therein.

Also employable are radiation-curable resins which are prepared by modifying thermoplastic resins to be radiation sensitive.

Illustrative radiation-curable resins are thermoplastic resins having contained or incorporated in their molecule, groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives.

The thermoplastic resins which can be modified into radiation-curable resins include vinyl chloride copolymers, saturated polyester resins, polyvinyl alcohol resins, epoxy resins, phenoxy resins, cellulosic derivatives, etc.

Other examples of the resins which can be modified to be radiation curable include polyfunctional polyester resins, polyether ester resins, polyvinyl pyrrolidone resins and derivatives (e.g., PVP-olefin copolymers), polyamide resins, polyimide resins, phenol resins, spiroacetal resins, and acrylic resins comprising as a polymerization component at least one acryl or methacryl ester having a hydroxyl group.

The second protective layer 6 has a thickness of about 0.1 to 30 μm, preferably about 1 to 10 μm. Films of less than 0.1 μm thick are difficult to produce as a uniform film, less moisture proof in a highly humid atmosphere, and thus insufficient to improve the durability of the magnetic thin-film layer 5. Films in excess of 30 μm thick are impractical because their shrinkage during curing causes the recording medium to be warped and cracks to occur in the protective layers.

The protective layer may be formed by coating an appropriate composition by any well-known coating methods such as spinner coating, gravure coating, and spray coating. The conditions under which the film is coated may be suitably chosen by taking into account the viscosity of the polymer component in the composition, the substrate surface state, and the intended coating thickness.

These radiation-curable resins may be cured by any of various well-known methods using electron or ultraviolet radiation.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

Electron radiation may also be used. Preferably, a radiation accelerator is operated at an accelerating voltage of 100 to 750 kV, more preferably 150 to 300 kV to generate radiation having a sufficient penetrating power such that the object is exposed to a radiation dose of 0.5 to 20 megarad.

Particularly preferred types of radiation for exposure include radiation generated by a radiation accelerator and ultraviolet radiation because of ease of control of a dose, simple incorporation in a manufacturing line, and electromagnetic radiation shielding.

Also, the second protective layer 6 may be formed from inorganic materials. Included are thin films of oxides, for example, silicon monooxide, silicon dioxide, aluminum oxide, titanium oxide, and zinc oxide, and nitrides, for example, silicon nitride, aluminum nitride, titanium nitride, and boron nitride. These thin films have a thickness of about 0.1 to about 10 μm and are prepared by vacuum deposition or sputtering, for example.

Furthermore, another substrate 25 may preferably be combined with the substrate 21 via a bonding layer 7 so as to sandwich the layers as previously formed on the substrate 21 between the substrates 21 and 25 as shown in FIG. 3. The second substrate 25 to be paired with the first substrate 21 has substantially the same shape as the first substrate 21, but may be made of any suitably chosen resinous material depending on the intended application of the medium.

Where writing and reading operations are conducted from the back surface of the first substrate 21 as previously described, the second substrate 25 to be paired therewith is usually only required to serve as a protective plate. No strict requirements like transparency are thus imposed on the resinous material of the second substrate 25, and a variety of resins may be employed, for example, thermoplastic resins such as polyethylene, polyvinyl chloride, polystyrene, polypropylene, polyvinyl alcohol, methacrylic resins, polyamides, polyvinylidene chloride, polycarbonates, polyacetals, and fluorine resins; and thermosetting resins such as phenolic resins, urea resins, unsaturated polyester resins, polyurethanes, alkyd resins, melamine resins, epoxy resins, and silicone resins. Also employable to form the second substrate 25 are inorganic materials such as glass and ceramic materials.

The bonding layer 7 may be an adhesive such as a hot-melt resin adhesive compound.

A so-called both-side recording medium may be produced by forming on the inside surface of the second substrate 25, an additional set of necessary layers of plasma-polymerized film undercoat layer and magnetic thin-film layer so that the resulting assembly has two magnetic thin-film layers which can be recorded or read out from the side of the respective substrates 21 and 25. In this case, the second substrate 25 is generally formed from the same material as the first substrate 21 which is previously exemplified.

Preferably, the overall area of the outside surfaces of the above-mentioned medium, namely the outside and inside peripheral surfaces and face and back surfaces of a disk-shaped medium, for example, is continuously covered with a coating layer 8 as shown in FIG. 3.

The coating layer 8 is formed from a cured film of a radiation-curable compound. The particular radiation-curable compound used for this purpose may be selected from the compounds previously described in connection with the protective layer 6.

The coating layer 8 in the form of a cured film of radiation-curable compound has a thickness of about 0.1 to 30 μm, preferably about 1 to 10 μm. Films of less than 0.1 μm thick are difficult to produce as a uniform film, less moisture proof in a highly humid atmosphere, and thus insufficient to improve the durability of the magnetic thin-film layer 5. Films in excess of 30 μm thick are impractical because their shrinkage during curing causes the recording medium to be warped and cracks to occur in the coating layer.

The coating layer may be formed by coating an appropriate composition by any well-known coating methods such as spinner coating, gravure coating, and spray coating. The conditions under which the film is coated may be suitably chosen by taking into account the viscosity of the coating composition, the substrate surface state, and the intended coating thickness.

The radiation-curable composition may be cured into a cured film or coating layer 8 by any of various well-known methods using electron or ultraviolet radiation as previously mentioned.

As understood from the foregoing description, the magneto-optical recording medium having a plasma-polymerized film undercoat layer between a substrate and a magnetic thin-film layer according to one embodiment of the present invention is moisture proof and durable in that the undercoat layer prevents deterioration of the magnetic layer due to entry of moisture from the substrate side.

Since the magnetic thin-film layer is covered with the first protective layer of plasma-polymerized film and the second protective layer, moisture proofness is also imparted to the magnetic layer on the side remote from the substrate, leading to a durability improvement.

Where the thus constructed medium on its protective layer is further combined with another substrate by bonding and the entire assembly is covered over the overall outside area with a coating layer of a predetermined composition, the resulting medium is significantly improved in moisture proofness and durability and thus experiences minimized deterioration even after an extended shelf storage in a high temperature, high humidity environment.

These advantages are also available in so-called both-side recording media.

EXAMPLES

Examples of the present invention are given below by way of illustration and not by way of illustration.

Example 1

On a disk-shaped substrate 21 of polymethyl methacrylate (PMMA) having a diameter of 20 cm, an intermediate layer 4 of $Si_3N_4$ was formed to a thickness of 900 Å by sputtering using a radio-frequency.

A magnetic thin-film layer 5 was formed on the intermediate layer by sputtering to produce a TbFeCo alloy thin film of 0.1 μm thick. The target used in the sputtering was an Fe target having Tb and Co chips rested thereon.

The magnetic layer-bearing substrate was placed in a vacuum chamber which was evacuated to a vacuum of $10^{-5}$ Torr. A plasma-polymerized film 35 was formed on the magnetic thin-film layer 5 under the following conditions.

|  | Plasma-polymerized film | | |
|---|---|---|---|
|  | 1 | 2 | 3 |
| Source gas | CH$_4$—100 SCCM | CH$_4$—50 SCCM<br>NH$_3$—50 SCCM | C$_2$H$_2$—75 SCCM<br>NO$_2$—25 SCCM |
| Carrier gas | Ar—50 SCCM | Ar—50 SCCM | Ar—50 SCCM |
| Plasma generation | | | |
| Pressure | 0.1 Torr | 0.1 Torr | 0.1 Torr |
| Power | 200 watts | 200 watts | 200 watts |
| Frequency | 13.56 MHz | 13.56 MHz | 13.56 MHz |
| Film | | | |
| Thickness | 300Å | 200Å | 350Å |
| Composition | H/C = 0.5 | H/C = 0.3<br>N/C = 0.08 | H/C = 0.4<br>N/C = 0.1<br>O/C = 0.15 |

The plasma-polymerized film is abbreviated as PPF in the following Tables and identified as type 1, 2, or 3 as defined above.

Elemental analysis of these plasma-polymerized films was by SIMS and the film thickness was measured by means of an ellipsometer.

A protecting layer 6 as formulated below was formed on the plasma-polymerized film 35. A coating composition of 100 parts by weight of a polyfunctional oligoester acrylate (trade name, Aronix M-8030) and 5 parts by weight of a photo-sensitizer (trade name, Bicure 55) was spinner coated on the plasma-polymerized film and exposed to ultraviolet radiation at 120 W/cm for 15 seconds for crosslinking and curing. The resulting protective layer had a thickness of 10 μm.

There were obtained a series of magneto-optical recording disks which were measured for some necessary properties. The results are shown in Table 1.

(1) Shelf stability

A sample was measured for C/N (carrier to noise ratio) expressed in dB both at the initial and after the magnetic layer side of the sample was exposed to a 60° C., RH 90% atmosphere for 300 hours. A change of C/N (ΔC/N in dB) was then determined. The C/N measurement was made under the following conditions.

| Rotating speed: | 4 m/sec. |
|---|---|
| Carrier frequency: | 500 kHz |
| Resolution: | 30 kHz |
| Recording power: | 3-4 mW at 830 nm |
| Reproducing power: | 1 mW at 830 nm |

(2) Bit error rate

A sample was measured for bit error rate of an EFM signal both at the initial and after storage in a 60° C., RH 90% atmosphere for 300 hours.

TABLE 1

| Sample No. | PPF protective layer type | Second protective layer | C/N Initial | ΔC/N | Bit error rate (× 10$^{-5}$) Initial | After storage |
|---|---|---|---|---|---|---|
| 101 | 1 | yes | 51.6 | −0.7 | 1.4 | 3.7 |
| 102 | 2 | yes | 51.8 | −0.7 | 1.8 | 3.9 |
| 103 | 3 | yes | 52.1 | −1.3 | 1.5 | 3.2 |
| 104* | — | yes | 51.9 | −1.4 | 1.7 | 5.3 |
| 105* | — | no | 51.9 | UM | 1.6 | Over scale |
| 106* | 1 | no | 51.7 | −3.4 | 1.3 | 5.8 |

*comparative samples
UM = recording/reproducing operation unabled within 40 hours because numerous pin-holes occurred.

As evident from the data of Table 1, those samples having a plasma-polymerized protective film and another protective layer of radiation-cured compound on the magnetic thin-film layer exhibit a less C/N change and a less bit error rate increase after storage at 60° C. and RH 90% for 300 hours. It is demonstrated that this construction is effective in improving shelf stability. The shelf stability becomes less satisfactory if the medium lacks either of the two protective layers.

Example 2

The same substrate 21 as used in Example 1 was plasma treated under the following conditions before the plasma-polymerized film undercoat layer 31 was formed thereon under the same conditions as described in Example 1.

The plasma treatment was effected by placing the substrate in a vacuum chamber which was evacuated to a vacuum of 10$^{-5}$ Torr. Argon was passed as the treating gas at a flow rate of 50 ml/min. under a gas pressure of 0.1 Torr while a high frequency voltage at 13.56 MHz was applied.

The intermediate layer 4, magnetic thin-film layer 5, plasma-polymerized film protective layer 35, and second protective layer 6 were consecutively applied in the same manner as in Example 1, obtaining a series of magneto-optical recording media as shown in Table 2. The samples were measured for (1) C/N and (2) bit error rate as previously described in Example 1 and for (3) bond strength as will be defined below.

(3) Bond strength

An adhesive tape was applied to the magnetic layer side of the prepared magneto-optical recording medium sample under a certain pressure. The tape was then peeled off in a direction having an angle of 180° to the initial plane at a fixed rate to determine the force required in peeling.

The result is expressed as a percentage increase of the bond strength W of each sample over the bond strength W0 of a control designated sample No. 209.

$$(W/W0 - 1) \times 100\%$$

The results are shown in Table 2.

TABLE 2

| Sample No. | Plasma treatment | PPF Undercoat, type | PPF Protective layer, type | Second protective layer | C/N Initial | C/N ΔC/N | Bond strength increase | Bit error rate (× 10⁻⁶) Initial | Bit error rate (× 10⁻⁶) After storage |
| --- | --- | --- | --- | --- | --- | --- | --- | --- | --- |
| 201 | yes | 1 | 1 | yes | 54.3 | −0.4 | 55% | 7.0 | 13.2 |
| 202 | yes | 2 | 2 | yes | 54.0 | −0.4 | 50% | 8.5 | 15.1 |
| 203 | yes | 3 | 3 | yes | 53.8 | −0.6 | 60% | 6.7 | 12.6 |
| 204 | no | 1 | 1 | no | 52.3 | −3.3 | 25% | 15.3 | 70 |
| 205 | no | 1 | 1 | yes | 52.7 | −0.7 | 30% | 16.2 | 31 |
| 206 | yes | 1 | 1 | no | 53.5 | −3.6 | 50% | 8.0 | 45 |
| 207* | no | 1 | — | no | 52.5 | UM after 60 hr. | 20% | 14.4 | over scale |
| 208* | no | — | 1 | no | 51.8 | UM after 60 hr. | 0% | 25.8 | over scale |
| 209* | no | — | — | no | 51.5 | UM after 40 hr. | 0% | 27.2 | over scale |

*comparative samples
UM = unmeasurable

As evident from the data of Table 2, those samples having a plasma-polymerized film undercoat layer on a substrate whose surface has been plasma treated, a magnetic thin-film layer on the undercoat layer, and a plasma-polymerized film protective layer and another protective layer of radiation-cured compound on the magnetic layer exhibit a less C/N change and a less bit error rate increase after storage under humid conditions, offering improved shelf stability. The combination of plasma treatment with the plasma-polymerized film leads to a significantly improved bond strength. This indicates a probable improvement in durability of the medium.

Among samples in which the substrate had not been subjected to a plasma treatment, those samples having a plasma-polymerized film of a specific composition formed in place as exemplified by sample Nos. 204 and 205 exhibit properties which are slightly poorer than the plasma-treated substrate samples, but satisfactorily acceptable in actual applications.

Example 3

The same substrate 21 as used in Example 1 was plasma treated under the same conditions as used in Example 2 before the plasma-polymerized film undercoat layer 31 was formed thereon under the same conditions as described in Example 1.

Thereafter, the intermediate layer 4, magnetic thin-film layer 5, plasma-polymerized film protective layer 35, and second protective layer 6 were consecutively applied in the same manner as in Example 1.

Further, a second substrate 25 of PMMA having a diameter of 20 cm was bonded onto the second protective layer 6 using a hot melt resin adhesive. The resulting assembly was covered with a radiation-curable compound-containing coating composition of the following formulation by spinner coating or dipping whereupon the overall outside area of the paired substrates is covered with the coating.

| Coating Composition | Parts by weight |
| --- | --- |
| Polyfunctional oligo-ester acrylate (Aronix M-8030) | 100 |
| Photo-sensitizer (Bicure 55) | 5 |

The coating was irradiated with UV radiation at 80 W/cm for 15 seconds for crosslinking and curing, obtaining a cured film having a thickness of 10 μm.

There were obtained a series of magneto-optical recording disks which were measured for shelf stability. The results are shown in Table 3.

Shelf Stability (C/N change)

A sample was measured for C/N (carrier to noise ratio) expressed in dB both at the initial and after the sample was stoed in a 60° C., RH 90% atomsphere for 500 hours. A change of C/N (ΔC/N in dB) was then determined. The C/N measurement was made under the following conditions.

| | |
| --- | --- |
| Rotating speed: | 4 m/sec. |
| Carrier frequency: | 500 kHz |
| Resolution: | 30 kHz |
| Recording power: | 3–4 mW at 830 nm |
| Reproducing power: | 1 mW at 830 nm |

TABLE 3

| Sample No. | PPF Undercoat, type | PPF Protective layer, type | Coating | C/N (dB) Initial | C/N (dB) ΔC/N |
| --- | --- | --- | --- | --- | --- |
| 301 | 1 | 1 | yes | 54.6 | −0.3 |
| 302 | 2 | 2 | yes | 53.9 | −0.3 |
| 303 | 3 | 3 | yes | 53.6 | −0.5 |
| 304* | 1 | 1 | no | 54.3 | −3.0 |
| 305* | — | — | yes | 51.8 | −6.7 |
| 306* | — | — | no | 51.5 | UM |

*comparative samples
UM = recording/reproducing operation unabled within 40 hours because numerous pin-holes occurred.

As evident from the data of Table 3, the media based on the preferred constructure as illustrated in Example 2 and having another substrate as a protective plate and a coating layer of a specific composition covering the overall outside surfaces of the medium exhibit good shelf stability in severer conditions (60° C., RH 90%, 500 hr.)

We claim:
1. A magneto-optical recording medium comprising
   a substrate,
   a perpendicular magnetizable thin film layer of an amorphous rate earth metal-transition metal alloy on said substrate,
   a first protective layer of a plasma-polymerized film on said magnetizable layer, and
   a second protective layer having a thickness of about 0.1 to 30 μm formed on said first protective layer by curing a radiation curable compound coating with radiation.

2. The magneto-optical recording medium of claim 1 wherein each of said protective layers has a thickness of 0.1 to 30 μm.

3. The magneto-optical recording medium of claim 1 which further comprises an intermediate protective layer between the substrate and the amorphous perpendicular magnetizable thin film layer.

4. The magneto-optical recording medium of claim 1, wherein said first protective layer is a plasma-polymerized film which contains carbon and at least one member selected from the group consisting of hydrogen, nitrogen and oxygen.

5. The magneto-optical recording medium of claim 1 wherein said first protective layer is a plasma-polymerized film which contains carbon.

6. The magneto-optical recording medium of claim 5 wherein said plasma-polymerized film contains 30 to 100 atom% of carbon.

7. A magneto-optical recording medium comprising
a substrate, a moisture-proofing undercoat layer having a thickness of at least 10 Å of a plasma-polymerized film on said substrate,
a perpendicular magnetizable thin film layer of an amorphous rare earth metal-transition metal alloy on said undercoat layer, and
a protective layer having a thickness of about 0.1 to 30 μm of a plasma-polymerized film on said magnetizable layer.

8. The magneto-optical recording medium of claim 7, wherein an intermediate protective layer further is present between the undercoat layer and the magnetizable thin film layer.

9. The magneto-optical recording medium of claim 7 wherein each of said undercoat layer and said protective layer is a plasma-polymerized film which contains carbon and at least one member selected from the group consisting of hydrogen, nitrogen, and oxygen.

10. The magneto-optical recording medium of claim 7 wherein each of said undercoat layer and said protective layer is a plasma-polymerized film which contains carbon.

11. The magneto-optical recording medium of claim 10 wherein said plasma-polymerized film contains 30 to 100 atom% of carbon.

12. The magneto-optical recording medium of claim 7 which further comprises a second protective layer on the surface of said protective layer of plasma-polymerized film.

13. The magneto-optical recording medium of claim 12 wherein each of said protective layers has a thickness of 0.1 to 30 μm.

14. A magneto-optical recording medium conmprising
a plasma-treated substrate,
a moisture-proofing undercoat layer having a thickness of at least 10 Å of a plasma-polymerized film on said substrate,
a perpendicular magnetizable thin film layer of an amorphous rare earth metal-transition metal alloy on said undercoat layer, and
a protective layer having a thickness of about 0.1 to 30 μm of a plasma-polymerized film on said magnetizable layer.

15. The magneto-optical recording medium of claim 14 wherein each of said undercoat layer and said protective layer is a plasma-polymerized film which contains carbon at least one member selected from the group consisting of hydrogen, nitrogen, and oxygen.

16. The magneto-optical recording medium of claim 14, wherein an intermediate protective layer further is present between the undercoat layer and the magnetizable thin film layer.

17. The magneto-optical recording medium of claim 14 wherein each of said undercoat layer and said protective layer is a plasma-polymerized film which contains carbon.

18. The magneto-optical recording medium of claim 17 wherein said plasma-polymerized film contains 30 to 100 atom% of carbon.

19. The magneto-optical recording medium of claim 14 which further comprises a second protective layer on the surface of said protective layer of plasma-polymerized film.

20. The magneto-optical recording medium of claim 19 wherein each of said protective layers has a thickness of 0.1 to 30 μm.

21. A magneto-optical recording medium comprising
a substrate,
a perpendicular magnetizable thin film layer of an amorphous rare earth metal-transition metal alloy on said substrate,
a moisture-proofing undercoat layer having thickness of at least 10 Å of a plasma-polymerized film on the surface of said magnetizable layer adjacent to said substrate, and
a coating of a cured film of a radiation-curable compound having a thickness of about 0.1 to 30 μm covering the overall outer surface of the medium.

22. The magneto-optical recording medium of claim 21 wherein said undercoat layer is a plasma-polymerized film which contains carbon.

23. The magneto-optical recording medium of claim 21 wherein said undercoat layer of a plasma-polymerized film is formed on the substrate which has been plasma treated in an inorganic gas atmosphere.

24. The magneto-optical recording medium of claim 21 which further comprises an intermediate layer between the undercoat protective layer of plasma-polymerized film and the magnetizable layer.

25. The magneto-optical recording medium of claim 21, wherein said undercoat layer is a plasma-polymerized film which contains carbon and at least one member selected from the group consisting of hydrogen, nitrogen, and oxygen.

26. The magneto-optical recording medium of claim 21, wherein a further additional protective layer of a plasma-polymerized film is present on the other surface of said magnetizable layer remote from said substrate.

27. The magneto-optical recording medium of claim 26 wherein said protective layer is a plasma-polymerized filmwhich contains carbon.

28. The magneto-optical recording medium of claim 26, wherein said additional protective layer is a plasma-polymerized film which contains carbon and at least one member selected from the group consisting of hydrogen, nitrogen, and oxygen.

29. The magneto-optical recording medium of claim 26 which further comprises a second protective layer on the surface of said additional protective layer of plasma-polymerized film.

30. The magneto-optical recording medium of claim 29 wherein each of said protective layers has a thickness of 0.1 to 30 μm.

31. The magneto-optical recording medium of claim 30 wherein said second protective layer is a thin film of an oxide or nitride.

32. The magneto-optical recording medium of claim 30 wherein said second protective layer is a radiation cured coating of a radiation-curable compound.

* * * * *

UNITED STATES PATENT AND TRADEMARK OFFICE
CERTIFICATE OF CORRECTION

PATENT NO. : 4,737,408
DATED : April 12, 1988
INVENTOR(S) : Tsuneo Kuwahara et al It is certified that error appears in the above-identified patent and that said Letters Patent is hereby corrected as shown below:

| Col. | Line | |
|---|---|---|
| 16 | 63, | delete "rate" and insert --rare--. |
| 17 | 52, | delete "conmpris- " and insert --compris- --. |
| 18 | 37, | delete "intermediate layer" and insert --intermediate protective layer--, |
|  | 38, | delete "protective", |
|  | 50, | delete "filmwhich" and insert --film which--. |
| 17 | 10 & 30, | delete ",", |
|  | 38 & 68, | delete "nitrogen," and insert --nitrogen--. |
| 18 | 41, 46 & 52, | delete ",", |
|  | 44 & 55, | delete "nitrogen," and insert --nitrogen--. |

Signed and Sealed this

Third Day of January, 1989

*Attest:*

DONALD J. QUIGG

*Attesting Officer*          *Commissioner of Patents and Trademarks*